United States Patent

[11] 3,542,102

| [72] | Inventor | Glen A. Watkins |
| | | Model, Colorado 81059 |
| [21] | Appl. No. | 738,062 |
| [22] | Filed | June 18, 1968 |
| [45] | Patented | Nov. 24, 1970 |

[54] CACTUS PROCESSING APPARATUS
1 Claim, 4 Drawing Figs.

[52] U.S. Cl. .................................................. 146/107, 302/37
[51] Int. Cl. .................................................. B02c 13/10
[50] Field of Search .................................. 146/107L, 70.1; 241/Mobile Crusher Digest, 81; 302/37

[56] References Cited
UNITED STATES PATENTS

| 754,903 | 3/1904 | Shelby | 241/81X |
| 2,557,344 | 6/1951 | Erickson | 146/107X |
| 2,716,347 | 8/1955 | Bottorff | 241/Mobile Crush. Dig. |

Primary Examiner—Andrew R. Juhasz
Assistant Examiner—Z. R. Bilinsky
Attorney—Emory L. Groff and Emory L. Groff, Jr.

ABSTRACT: A wheeled support vehicle carries a hammermill which is driven by a suitable drive means. Cactus is adapted to be placed in an inclined hopper which feeds the cactus into the inlet of the hammermill. The hopper includes a foraminous bottom which separates foreign matter from the cactus before entering the hammermill. A curved discharge spout is connected with the outlet of the hammermill for discharging processed cactus in a desired direction.

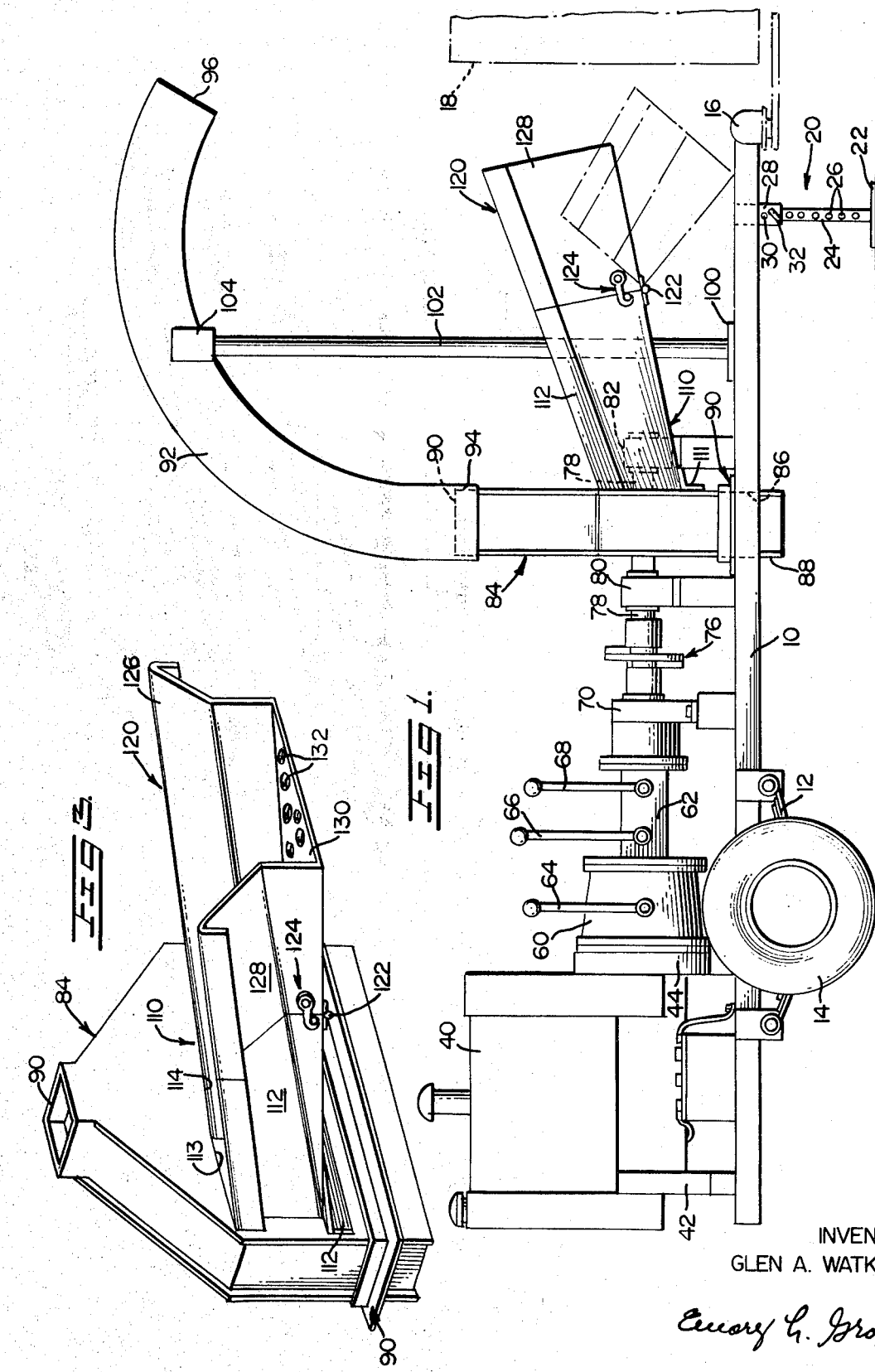

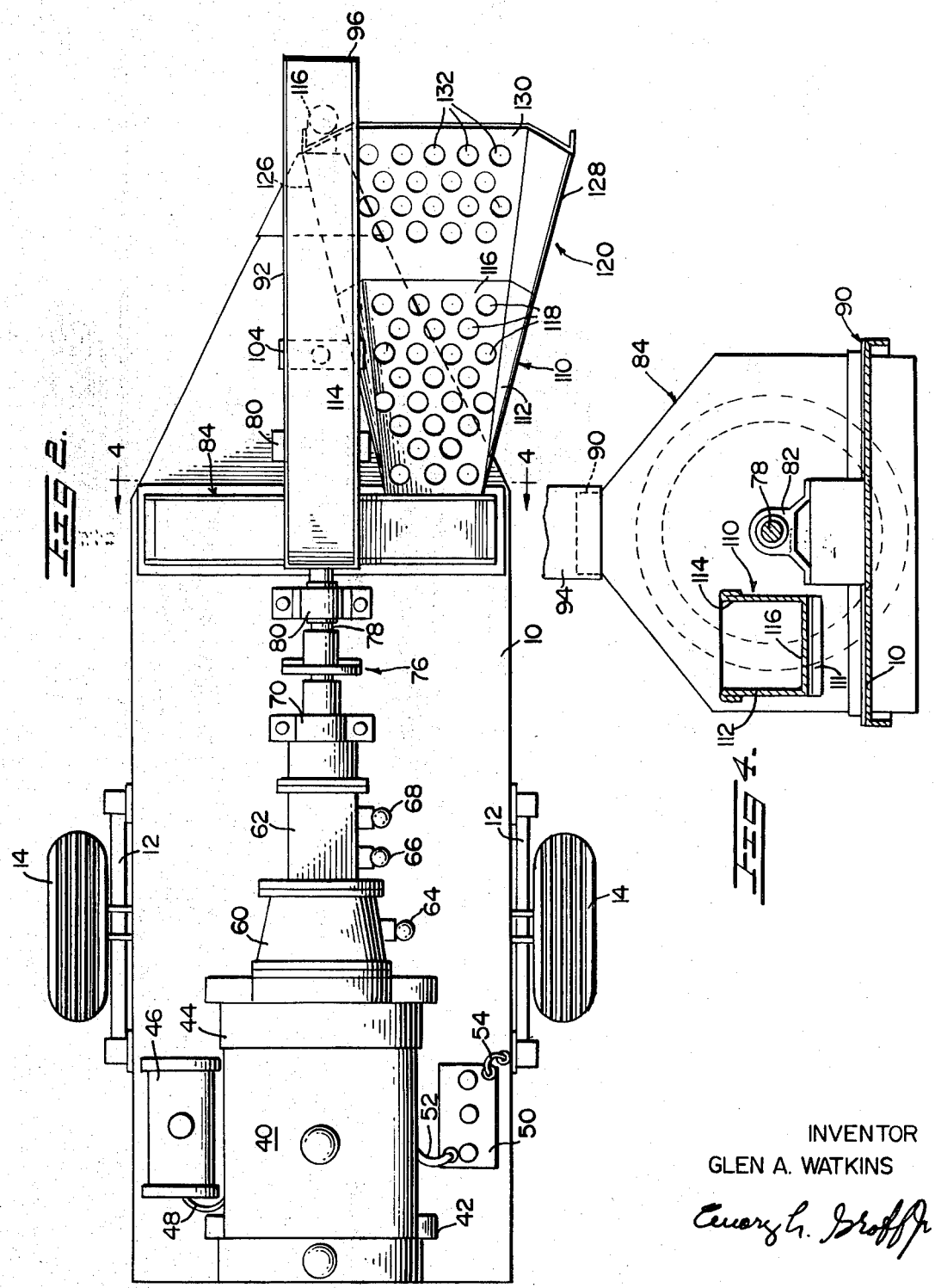

CACTUS PROCESSING APPARATUS

BACKGROUND OF THE INVENTION

The present invention relates to apparatus for processing cactus into a usable feed for livestock and the like.

The cactus processing apparatus of the present invention is adapted to be employed for processing cactus as it is found in its natural state on uncultivated land. Accordingly, the apparatus of the present invention must be readily portable so that it can completely move from place to place wherever cactus happens to be available for processing. The apparatus must further be of a rugged construction so as to be moved over relatively rough terrain, and must be of such a construction that it can be readily assembled and disassembled for repair and maintenance as required.

When using the apparatus, the cactus can be hand cut and then thrown by a pitchfork into the hopper of the apparatus. Since the cactus is harvested in the wild state and in areas which are not cultivated, it is necessary to provide a means for eliminating or separating out rocks, dirt and other foreign matter from the cactus before the cactus is processed by the disintegrator means of the apparatus to provide a palatable feed for livestock.

The processing apparatus of the present invention may be employed with various types of trailers or other devices for receiving the processed cactus, and these devices which receive the processed cactus may be disposed in various relationships with respect to the processing apparatus itself. Accordingly, it is desirable to provide a discharge means adapted to discharge the processed cactus into such a receiving device regardless of the orientation of the receiving device with respect to the processing apparatus.

SUMMARY OF THE INVENTION

The apparatus of the present invention is mounted upon a wheeled vehicle such as a trailer which is adapted to be towed by a suitable tractor or the like to any desired location. The construction is such that the overall arrangement is very rugged and readily assembled or disassembled as required.

The disintegrator means of the present invention comprises a hammermill of conventional construction which is driven by a suitable drive means mounted upon the support vehicle.

Cactus to be processed is fed into the hammermill by an elongated inclined hopper which feeds the cactus downwardly under the influence of gravity. This hopper is provided with a foraminous bottom which has holes therein of sufficient dimension to allow dirt, rocks and other foreign matter to drop through, while not allowing the cut cactus to drop through. Accordingly, undesirable foreign matter is separated out from the cactus before it enters the inlet of the hammermill.

The discharge means of the present invention comprises an elongated generally arcuate tubular spout which is operatively associated with the outlet of the hammermill. This spout can be mounted in different operative positions with respect to the hammermill so that the processed cactus can be discharged in various desired positions depending on the particular arrangement being employed.

BRIEF DESCRIPTION OF THE DRAWINGS

FIG. 1 is side view of a cactus processing apparatus according to the present invention;

FIG. 2 is a top view of the apparatus illustrated in solid lines in FIG. 1;

FIG. 3 is a top perspective view illustrating the hammermill and the associated feed hopper; and FIG. 4 is a sectional view taken substantially along line 4—4 of FIG. 2 looking in the direction of the arrows.

DESCRIPTION OF THE PREFERRED EMBODIMENT

Referring now to the drawings wherein like reference characters designate corresponding parts throughout the several views, a support means in the form of a wheeled vehicle is provided and comprises a trailer including a flat bed 10 having spring means 12 suspended at opposite sides thereof and carrying the rubber-tired wheels 14. This arrangement enables the trailer to be drawn over relatively rough terrain and into desired operative position.

The trailer is provided with a conventional trailer hitch 16 at the forward end thereof which may be attached to any suitable means which is adapted to tow the trailer. The towing means may also incorporate a means indicated by phantom line 18 in FIG. 1 for receiving the processed cactus.

An adjustable support means indicated generally by reference numeral 20 is provided for supporting the forward end of the trailer in a suitable fixed relationship when at a job site. This support means 20 includes a base portion 22 from which extends vertically upwardly a rigid tubular portion 24 having a plurality of holes 26 formed therethrough. A tubular portion 28 is affixed to the trailer and is adapted to telescopically receive portion 24. The tubular portion 28 is provided with holes 30 formed therethrough, and a pin means 32 is adapted to be inserted through aligned holes in the two tubular portions for supporting the forward end of the trailer at a particular level above the supporting surface upon which the base portion 22 rests.

A drive means for driving the disintegrator means in the present invention is indicated generally by reference numeral 40 and may comprise a conventional gasoline driven internal combustion engine or the like. The engine is supported on the bed of the trailer by a pair of spaced support means 42 and 44. As seen particularly in FIG. 2, a fuel tank 46 is supported on the bed of the trailer and is connected by a flexible conduit 48 with the engine 40. A battery 50 is also supported by the bed of the trailer and is connected by cables 52 and 54 to the engine and to a ground means respectively.

The output of the engine is connected with a selectively operable clutch assembly 60, the output of the clutch assembly being connected with a suitable transmission 62. A first manually operable lever 64 is provided for operating the clutch assembly, and a pair of manually operable levers 66 and 68 are connected with the transmission for operating the transmission. It should be understood that the clutch assembly and transmission are of conventional construction.

The output shaft from the transmission is supported by a bearing means 70 and is operatively connected through a flexible coupling indicated generally by reference numeral 76 with the shaft 78 of the hammermill hereinafter described. Shaft 78 is rotatably supported by a bearing means 80.

The shaft 78 is connected with the rotor portion of a conventional hammermill indicated generally by reference numeral 84 and being of known construction. The shaft 78 extends completely through the hammermill and is supported at its forward end by a further bearing means 82.

As seen in FIG. 1, the bed 10 of the trailer is provided with an elongated slot 86 which receives the lower portion 88 of the hammermill. A flange assembly 90 is secured to and extends around the outer periphery of a lower part of the hammermill and is adapted to rest on the bed 10 whereby the hammermill will be retained in the operative position illustrated in FIGS. 1 and 4.

As seen most clearly in FIGS. 1 and 3, the hammermill includes an outlet 90 at the uppermost portion thereof, this outlet being generally square in cross-sectional configuration. The discharge means of the present invention includes an elongated generally arcuate tubular spout 92 having a cross-sectional configuration substantially complementary to that of the discharge 90 of the hammermill. The dimension of the tubular spout is such that the end 94 thereof is adapted to fit down over the discharge 90. The opposite open end 96 of the discharge spout discharges processed cactus into any suitable receiving device.

With the discharge arrangement illustrated, the discharge spout may be lifted off of the discharge of the hammermill and positioned in various relationships with respect thereto so that processed cactus may be discharged in different directions from the apparatus as required.

A brace is provided for supporting the discharge spout and includes a base portion 100 carried by the bed 10 of the trailer. A vertically upstanding support 102 is secured to and extends upwardly from the base 100. A generally U-shaped support bracket 104 is secured to the upper end of support 102 and fits about the discharge spout for supporting the discharge spout in the position shown in FIG. 1.

The feed means of the present invention includes a hopper including a first portion indicated generally by reference numeral 110 supported by an angle member 111 secured to one side of the hammermill and to the undersurface of portion 110. This portion 110 of the hopper is inclined downwardly toward the inlet opening 113 of the hammermill as seen in FIG. 3.

As seen most clearly in FIG. 2, the hopper portion 110 tapers from its outer portion inwardly toward the inner portion adjacent the inlet opening of the hammermill. Hopper portion 110 includes a pair of sloping sidewalls 112 and 114 extending upwardly from opposite sides of a bottom wall 116. This bottom wall is foraminous and is provided with a plurality of holes 118. These holes are so dimensioned that they will allow rocks, dirt and other foreign matter to drop therethrough, while being of such a dimension as to not permit cactus to drop therethrough. Accordingly, any undesirable foreign matter will be separated from the cactus before it enters the inlet of the hammermill.

The feed hopper includes a second portion 120 which is pivotally interconnected with the portion 110 by a hinge means 122. A conventional latch mechanism indicated generally by reference numeral 124 is provided at the side of the hopper for holding the two hopper portions in the operative relationship illustrated in solid lines in the drawings.

Hopper portion 120 includes sloping sidewalls 126 and 128 extending upwardly from opposite sides of a bottom wall 130. It should be understood that in the operative erected position as shown in solid lines, the sidewalls 126 and 128 are aligned with the sidewalls 114 and 112 respectively, while the bottom wall 130 is aligned with the bottom wall 116.

Bottom wall 130 of hopper portion 120 is also foraminous and is provided with a plurality of spaced holes 132 similar to holes 118 provided in the bottom wall of hopper portion 110, and these latter holes serve the same purpose as previously described to separate out undesirable foreign matter.

In FIG. 1, hopper portion 120 is shown in solid lines in its operative erected position, and it is also shown in phantom lines in the position it may occupy when the latch mechanism 124 is released and it is swung downwardly about the hinge means 122.

It is apparent from the foregoing that the apparatus of the present invention may be readily moved from place to place and is formed of conventional mechanisms of rugged construction which may be readily assembled and disassembled when desired. The foraminous bottom wall of the hopper means is adapted to eliminate undesired foreign matter before the cactus is fed into the hammermill, and the discharge means is adapted to discharge processed cactus in the desired direction into a suitable receiving device.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well conjointly cooperative equivalents are therefore intended to be embraced by those claims.

I claim:

1. Cactus processing apparatus comprising in combination, wheeled support means including a flat bed, disintegrator means supported by said flat bed and including an inlet and an outlet, said flat bed including an elongated slot disposed transversely thereof for receiving a portion of said disintegrator means, said disintegrator means comprising a hammermill the lower portion of which extends through said slot, said hammermill including a peripheral flange on its lower portion which engages said flat bed around said elongated slot to retain said hammermill in predetermined position relative to said support means, drive means mounted on said flat bed for driving said disintegrator means, feed means connected with the inlet of said disintegrator means for feeding cactus into said disintegrator means, said feed means comprising an elongated hopper inclined downwardly toward the inlet of said disintegrator means and including inner and outer portions, said outer portion pivotally connected to said inner portion, and latch means for retaining said inner and outer portions in operative erected position, each of said portions including a foraminous bottom wall and oppositely disposed sidewalls, discharge means connected with the outlet of said disintegrator means for discharging processed cactus from the apparatus, said discharge means including an elongated tubular spout of generally arcuate configuration, said spout being operatively associated with the outlet of said disintegrator means and adapted to be positioned for discharging processed cactus in different directions from the outlet of the disintegrator means.